May 10, 1966  W. J. KUDLATY ETAL  3,250,873
FILTER SIGNAL

Filed March 20, 1964  2 Sheets-Sheet 1

INVENTORS.
WALTER J. KUDLATY
THEODORE B. HOLLIDAY
ROBERT LUCHETTA
BY Parker & Carter
Attorneys.

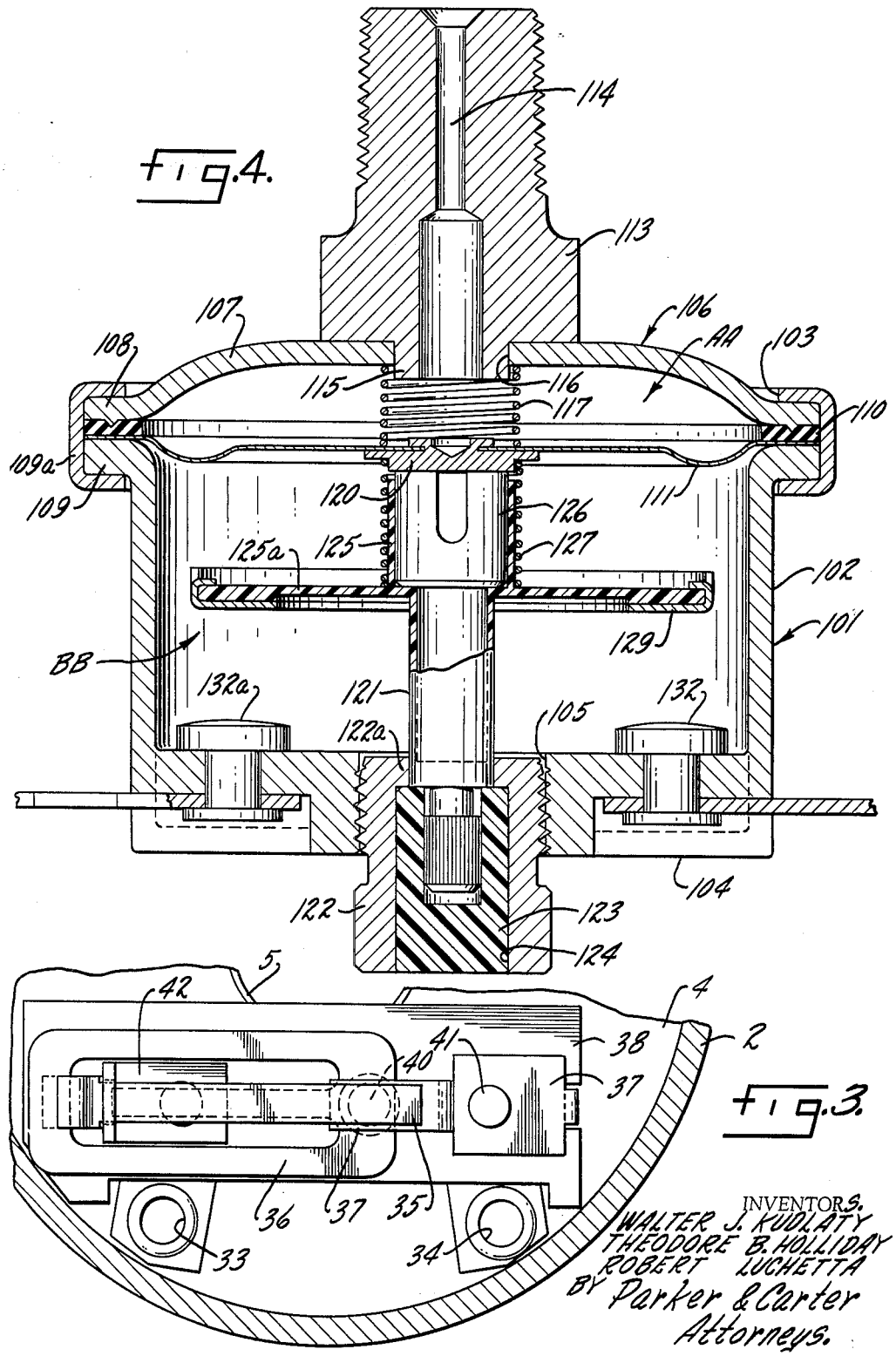

United States Patent Office 3,250,873
Patented May 10, 1966

3,250,873
FILTER SIGNAL
Walter J. Kudlaty and Theodore B. Holliday, Elmhurst, and Robert Luchetta, Bensenville, Ill., assignors to Marvel Engineering Company, Chicago, Ill., a corporation of Illinois
Filed Mar. 20, 1964, Ser. No. 353,539
6 Claims. (Cl. 200—83)

This invention relates to the field of filters and has particular relation to a signal device for use in filter systems.

One purpose is to provide a filter signal effective to indicate the internal condition of a filter.

Another purpose is to provide a filter signal responsive to predetermined pressure values across a filter element.

Another purpose is to provide a filter signal responsive to the presence of contaminants within the filter with which the signal may be associated.

Another purpose is to provide a filter signal productive of a plurality of indications.

Another purpose is to provide a filter signal automatically operable in response to one of a plurality of preselected conditions.

Another purpose is to provide a filter signal having a mechanical indicator operable in response to a preselected condition.

Another purpose is to provide a filter signal having resetting means.

Another purpose is to provide a filter signal having means productive of remote indication.

Another purpose is to provide a filter signal having a snap-action response to a preselected condition.

Another purpose is to provide a filter signal usable with a wide variety of filter mechanisms.

Another purpose is to provide a filter signal requiring no modification to the filter with which it may be associated.

Another purpose is to provide a filter signal unaffected by the condition, nature or viscosity of the filtered fluid per se.

Another purpose is to provide a filter signal having elements shielded from contact with the filtered fluid.

Another purpose is to provide a filter signal free from adverse affect of intermittent minute pressure surges in the system with which it may be associated.

Another purpose is to provide a filter signal effective in any position and capable of precise repetitive accuracy.

Another purpose is to provide a filter signal locatable in a plurality of locations in the system with which it may be associated and particularly suited to subatmospheric pressures.

Another purpose is to provide a filter signal requiring a minimum spatial allocation and of maximum compactness.

Another purpose is to provide a filter signal of minimum cost in manufacture.

Another purpose is to provide a filter signal requiring a minimum level of maintenance.

Other purposes will appear from time to time during the course of the specification and claims.

The invention is illustrated more or less diagrammatically in the accompanying drawings, wherein:

FIGURE 3 is a view taken on the line 3—3 of FIGURE 2; and

FIGURE 4 is a side elevation in partial cross section illustrating a variant form of the invention.

Like parts are indicated by like numerals throughout the specification and drawings.

Figure 1:
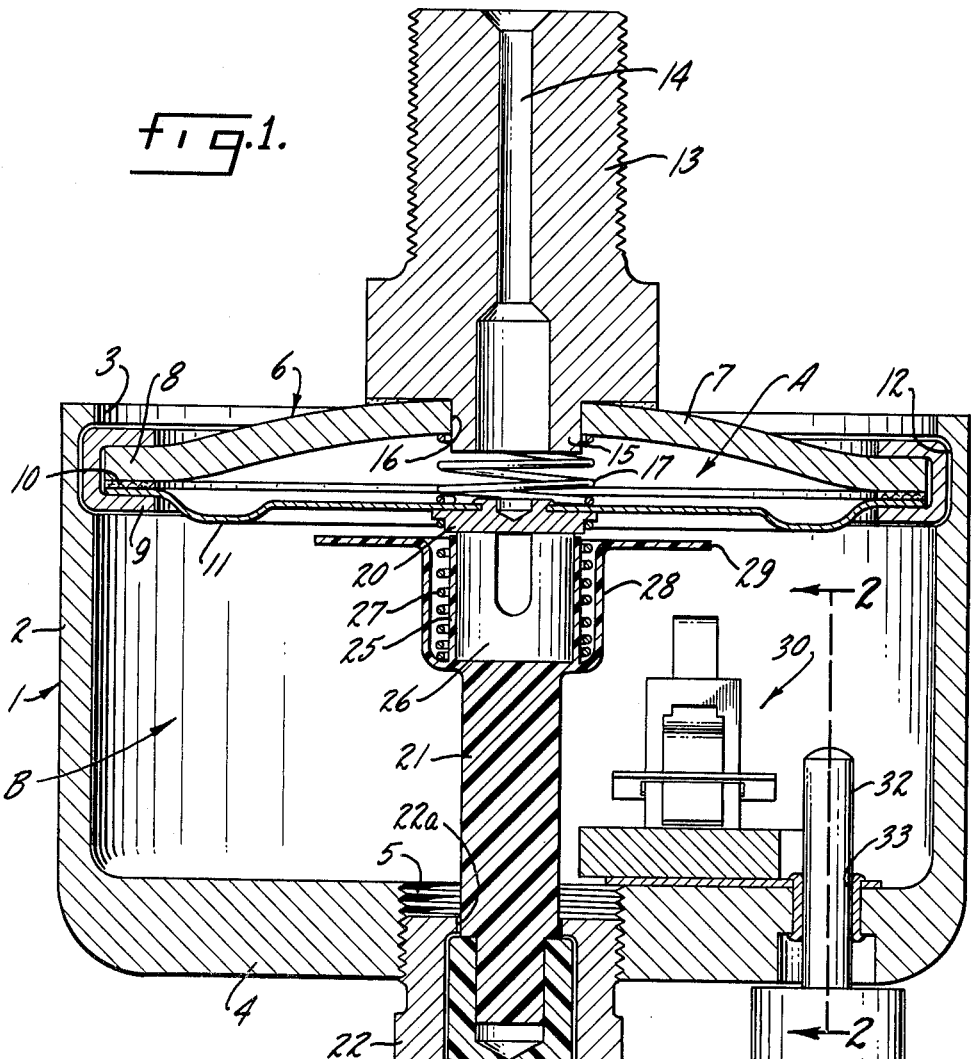
FIGURE 1 is a side elevation in partial cross section.

Referring now to the drawings, and particularly to FIGURE 1, the numeral 1 indicates a housing. The housing has a generally cylindrical wall 2 including an open end 3 and a closed end wall 4. A central, threaded aperture 5 is formed in the wall 4. An end cap 6 is provided for the open end 3 of housing 1. The cap 6 includes a domed generally annular wall portion 7 having an annular peripheral flange segment 8. A clamp ring 9 secures to the inner surface of cap 6 a seal gasket 10 and a flexible diaphragm 11 preferably formed of thin metal or metal-like material. The clamp ring 9 seats within an annular groove 12 formed in the inner surface of wall 2 adjacent the open end 3. A fitting 13 has a through passage 14 and a boss 15, the boss 15 seating within an opening 16 centrally positioned in the cap 6 to provide communication through passage 14 with the area A on one side of diaphragm 11 within housing 1. A coil spring 17 has its opposite ends engaging the inner surface of cap 6 and the surface of diaphragm 11 within chamber A to urge the diaphragm away from boss 15 in the inner surface of cap 6.

The diaphragm 11 carries a metal armature element 20 with a major portion thereof on the opposite side of diaphragm 11 from chamber A. An indicator rod 21 is slidably positioned in chamber B on said opposite side of diaphragm 11 for reciprocation through an adjusting nut 22 which is in turn threaded into aperture 5. The rod 21 carries an indicator head 23 at its outer end, the head 23 normally seating within a pocket 24 formed in the nut 22, it being understood that the head 23 may be suitably colored for immediate recognition when exposed. At its opposite end the rod 21 has a cage 25 in which is positioned a magnet 26. A coil spring 27 surrounds cage 25 and has its opposite ends in engagement with the armature element 20 and a cuplike member 28 which is secured to rod 21 and surrounds the spring 27. Thus spring 27 urges armature 20 and magnet 26 in opposite directions and urges rod 21 outwardly of housing 1. An annular, outwardly extending flange 29 is carried by the cup member 28. An inwardly directed flange 22a on nut 22 engages a rear surface of head 23 and restrains rod 21, magnet 26, cage 25 and cup 28 from movement with diaphragm 11 in a direction toward chamber A from the position shown in FIGURE 1.

Positioned within the housing 1 adjacent rod 21 and beneath a portion of flange 29 is at least one microswitch structure indicated generally by the numeral 30. A connector fitting 31 is secured to housing 1 and has a terminal element 32 extending through an insulated aperture 33 in housing 1. As may be best seen in FIGURE 2, a second insulated aperture 34 may be provided in housing 1. The microswitch structure includes a contact arm 35, a yieldable element 36 and a second contact arm 37. A base plate 38 carries the elements 35, 36, 37 and suitable connector posts 39, 40 and 41 retain the support 42 for element 35, and the elements 36, 37, respectively.

Referring now to the variant form of the invention illustrated in FIGURE 4, it will be observed that a housing 101 includes a generally cylindrical wall portion 102 having an open end 103 and a closing end wall 104. End wall 104 has formed therein a central aperture 105. A closure cap 106 has a central domed portion 107 and an annular peripheral flange portion 108. The housing wall 102 terminates in an outwardly directed annular flange portion 109. A clamp ring 109a clamps a seal gasket 110 and a peripheral portion of a flexible diaphragm 111 between the flanges 108, 109. A fitting 113 has an axial passage 114 leading to communication with a chamber AA between the cap 106 and diaphragm 111, the fitting 113 having a boss 115 seated within an opening 116 in cap 106. A coil spring 117 is positioned in chamber AA to urge the diaphragm 111 away from cap 106.

An armature element 120 is carried by diaphragm 111.

An elongated indicator rod 121 is slidably mounted in housing 101 and in adjustment element 122. The rod 121 carries at its outer end an indicator button 123 which is in turn normally seated within a socket 124 formed in element 122. A flange 122a limits movement of rod 121 inwardly of housing 101. The rod 121 carries a cage or sleeve 125 adjacent its opposite or inner end. A magnet 126 is carried within the sleeve 125 for contact with the armature 120. A coil spring 127 surrounds the sleeve 125 and has its opposite ends in engagement with the armature element 120 and an inner portion of an annular flange 125a which in turn carries contact disc 129. A pair of spaced contact terminals 132, 132a are spaced within housing 101 and extend through a portion of the wall 104 thereof, the outer portions of members 132, 132a being suitably secured to appropriate electrical conductors and the number of such contact terminals being varied as desired.

The use and operation of the invention are as follows:

The filter signal of the invention may be employed in a plurality of fluid systems requiring filtering. Such systems normally including filter, a plurality of pipes or conduits and a pump for circulation of the fluid. The signal of the invention may be suitably secured to the pump side of the filter at a plurality of points in the line extending from the pump side of the filter to the pump. As the pump draws fluid through the filter a pressure differential is created across the filter element. As fluid continues to flow through the filter element, contaminants begin to build up on the filter element. With such buildup of contaminants on the filter element the force required to draw the fluid through the filter is increased and the differential pressure across the filter also increases.

Dependent upon the area of the filter and the depth and effectiveness thereof, a differential pressure of a predetermined value exists across a clean filter. When the filter element becomes half clogged, a pressure drop is created of approximately more than twice the value of that across a clean filter element. With further clogging the pressure drop rises rapidly and the rate of such pressure drop increases at a greater rate. Hence the signal of the invention may be adjusted for automatic operation in response to the creation of a predetermined vacuum or negative pressure on the pump or downstream side of a filter element and may be set to operate at a predetermined level of filter clogging. The invention is effective upon the existence of such vacuum of reduced pressure whether the same be caused by such clogging or by dirt in the system conduits, an overspeeding pump, low oil supply or other deleterious and undesirable circumstances.

Such drop in pressure is communicated through the passages 14, 114 to the chambers A, AA, drawing the flexible diaphragm 11, 111 toward the cap 6, 106.

The armature element 20, 120 extends across the poles of magnet 26, 126 and in the normal position of the signal, as indicated in the drawings, is held in contact with the magnet by the magnetic force thereof. Coil spring 27, 127 is of insufficient force to separate the magnet 26, 126 from the armature element 20, 120. When, however, the diaphragm 11, 111 is drawn, against the action of spring 17, 117, toward the cap 6, 106 by the negative pressure communicated through passage 14, the element 20, 120 is separated from the magnet 26, 126, the latter being held against movement with the diaphragm 11, 111 by engagement of the head 23, 123 with the inwardly directed inner flange of the nut 22, 122. The armature 20, 120 and magnet 26, 126 provide a magnetic interlock. Spring 27, 127 produces a zero overlap, destroying said interlock upon separation of members 20, 120 and 26, 126. The moment the armature element 20, 120 is separated from the magnet 26, 126 the effect of the magnetic force generated by the latter is rapidly reduced and substantially immediately dissipated and the spring 27, 127 is freed and effective to further separate the element 20, 120 from the magnet 26, 126 and to move the indicator rod 21, 121 away from cap 6, 106 in a direction outwardly of housing 1 to expose the indicator button 23, 123 which, as above indicated, may be colored a suitable indicating color, red being effective to indicate the danger present in the clogged filter.

In addition to the provision of the mechanical indicator above described, the action effective to produce said mechanical indication is also employable to provide additional indication either at the place of the signal or at a location remote therefrom and to shut down or stop the operation of engines, equipment and the like with which the invention is in use.

Figure 2:
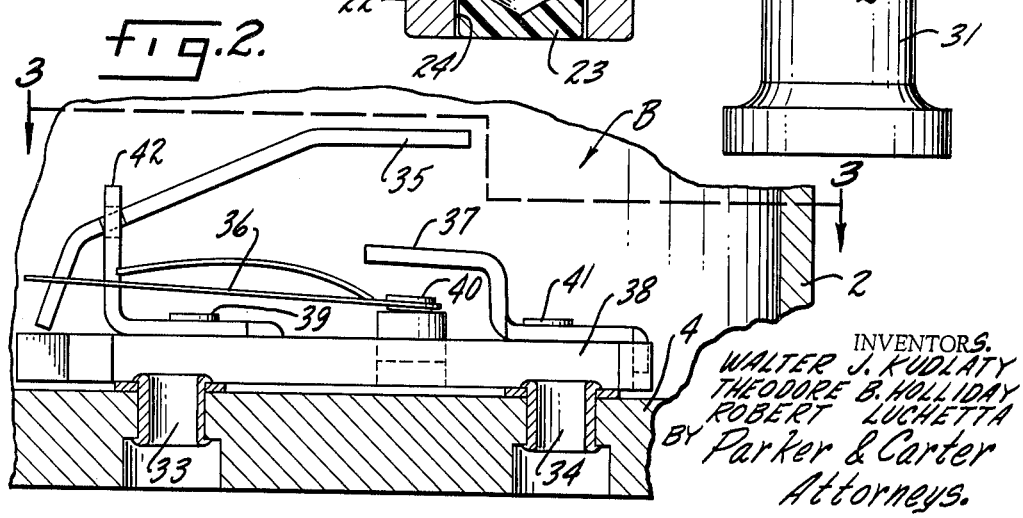
FIGURE 2 is a view taken on the line 2—2 of FIGURE 1.

Thus, as rod 21, 121 is moved in a direction outwardly of housing 1, i.e., away from cap 6, 106, the element 29 of the form of the invention illustrated in FIGURES 1–3 is brought into contact with arm 35 of switch structure 30 and the switch structure 30 is actuated to close an electrical circuit and thus to actuate an additional indicator either at a point adjacent to the filter of the invention or at a point remote therefrom. Such additional indicator may, for example, take the form of an electrically actuated sound or light generating device or a combination thereof. If the latter be positioned at a remote point, suitable electrical conductors are connected to connection 31, for example. The switch structure 30 may provide a "snap-action," there being an initial resistance to movement thereof by the member 29 as the rod 21 moves in a direction outwardly of housing 1 in response to the action of spring 27, the latter having been released by separation of armature 20, 120 from magnet 26, 126. When the resistance of the switch structure 30 is finally overcome, however, it is permitted to snap into electrical energy-transmitting position. Considering the variant form of the invention illustrated in FIGURE 4, the contact disc 129 is carried by rod 121 and moves with rod 121 in a direction toward wall 104, the disc 129 coming into contact with terminals 132, 132a and closing a circuit through suitable electrical conductors to the additional indicator light, bell or the like. While the switch structures illustrated in the drawings are of normally-open type, it will be realized that normally-closed type switch assemblies could, if desired, be employed, the rod 21, 121 moving, for example, in the same way to separate elements 29, 129 from the switch parts to open the same.

The signal of the invention may be reset by the mere manual inward movement of the indicator button 23, 123 by the operator to seat the button 23, 123 in the socket or well 24, 124 or adjusting element 22, 122. Such inward movement of button 23, 123 and rod 21, 121 to which it is attached breaks the electrical connection through switch structure 30 or terminals 132, 132a and thus deactivates the remote indication and the seating of indicator button 23, 123 destroys the mechanical indication. Resetting while system is operating and filter is clogged is automatically precluded, since the indicator, signal-actuating element will not magnetically interlock under such conditions.

With the substitution of a clean for a clogged filter element in an operating system negative pressure is such in chamber A, AA that diaphragm 11, 111, along with element 20, 120 which it carries, are returned to the position illustrated in the drawings, the element 20, 120 being thus again placed in contact with magnet 26, 126 and across the poles thereof. The effect of the light spring 17, 117 and the metallic diaphragm 11 is to position the parts in the at-rest position shown in FIGURES 1 and 4. The element 22, 122 may be rotated inwardly or outwardly of threaded apertures 5, 105 to control the point in the negative pressure spectrum communicated by passage 14, 114 at which further movement of the assembly toward cover 6, 106 will separate the armature and magnet and the signal of the invention will automatically respond. The forces present in diaphragm 11, armature 20, magnet 26, 126, spring 27, 127 and spring 17, 117 being predetermined, it will be understood that the negative pressure at which it may be desired that the signal of the invention respond may be accurately set, the said negative pressure being in turn related to the amount of clogging in the filter element considered acceptable in the particular system with which the invention may be employed.

Thus is provided a filter signal productive of a plurality of types of indication that an undesired level of contamination or clogging has occurred in the filter element. The level at which the signal of the invention functions may be easily and simply adjusted as desired. The operable elements of the invention may be easily and simply reset following actuation and removal of the cause of actuation.

It will be observed that the fluid being filtered is never brought into contact with the control elements of the signal of the invention. Fluid, for example, is sealed from entry into the chamber B, BB of housing 1 in which the magnet 26, 126 and its action upon element 20, 120 occurs and at which the spring 27, 127, switch structure 30 and elements 129, 132, 132a are positioned. Thus the operable elements of the signal are free from any effect of variance in the viscosity of the fluid and free from the effect of any contaminants in the fluid. Since the signal of the invention is designed for installation in the system on the pump or downstream side of the filter, only filtered fluid is presented to passage 14, 114 and chamber A, AA on the opposite side of diaphragm 11, 111 from chamber B, BB. Since, as is preferred, diaphragm 11 is formed of metal-like material, it is relatively immune to deleterious effects of contact with the filtered fluid in chamber A.

Similarly, relatively minute pressure surges and intermittent drops in pressure communicated to passages 14, 114 will not affect the operation of the structure, the spring 17, 117, the stiffness of metallic diaphragm 11 and the magnetic attraction of magnet 26, 126 with element 20, 120 being effective to resist such intermittent, short-term pressure drops and surges. Nonetheless, upon the clogging of the filter effective to produce a steady and continuing negative pressure at or beyond the predetermined value will be effective to overcome the action of spring 17, 117 and the attraction of magnet 26, 126 with armature element 20, 120 and thus to separate the latter elements and to free spring 27, 127 for action upon rod 21, 121 and the resultant creation of the indications described.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

There is claimed:

1. A filter indicator comprising a housing, a diaphragm dividing said housing into a first chamber and a second chamber, an inlet passage communicating with said first chamber on one side of said diaphragm, an indicator rod slidably mounted in a wall of said housing and extending into said second chamber, magnetically attracted elements carried by said diaphragm and said rod for normal direct, surface-to-surface contact one with the other, yielding means directly engaging at least one of said elements and urging said magnetically attracted elements apart whenever said elements are out of contact with each other and urging said rod outwardly of said housing.

2. A filter indicator comprising a housing, a diaphragm dividing said housing into a first chamber and a second chamber, an inlet passage communicating with said first chamber on one side of said diaphragm, an indicator rod slidably mounted in a wall of said housing and extending into said second chamber, magnetically attracted elements carried by said diaphragm and said rod for normal direct, surface-to-surface contact one with the other, yielding means directly engaging at least one of said elements and urging said magnetically attracted elements apart whenever said elements are out of contact with each other and urging said rod outwardly of said housing, and a second yielding means urging said diaphragm away from said inlet.

3. A filter indicator comprising a housing, a diaphragm dividing said housing into a first chamber and a second chamber, an inlet passage communicating with said first chamber on one side of said diaphragm, an indicator rod slidably mounted in a wall of said housing and extending into said second chamber, magnetically attracted elements carried by said diaphragm and said rod for normal direct, surface-to-surface contact one with the other, yielding means directly engaging at least one of said elements and urging said magnetically attracted elements apart whenever said elements are out of contact with each other and urging said rod outwardly of said housing, switch elements in said second chamber and a switch-operating member carried by said rod for contact with said switch elements when said rod is moved by said yielding means.

4. A filter indicator comprising a housing, a movable wall in said housing, an indicator slidably mounted in said housing on one side of said wall, an inlet in the wall of said housing communicating with the area on the opposite side of said movable wall, a pair of magnetically attractable elements, one of said elements being carried by said movable wall, the other of said elements being carried by said indicator, said elements being normally in surface-to-surface direct contact with each other, and yielding means directly engaging at least one of said elements and urging said elements in opposite directions against the magnetic attraction therebetween, said yielding means having insufficient force to separate said elements when said elements are in contact one with the other, said yielding means being effective to move said elements in opposite directions whenever said elements are out of said contact.

5. A filter indicator comprising a housing, a movable wall dividing said housing, an inlet passage communicating with said housing on one side of said wall, an actuator member in said second chamber, a pair of magnetically attractable elements, one of said elements being carried by said movable wall, the other of said elements being carried by said actuator, said elements being normally in surface-to-surface direct contact with each other switch parts in said second chamber and yielding means directly engaging at least one of said elements and urging said magnetically attractable elements in opposite directions and urging said actuator into contact with said switch parts.

6. A filter signal comprising a housing, a movable wall dividing said housing into a first chamber and a second chamber, an inlet passage in said housing communicating with said first chamber, a member movably carried in said second chamber, a pair of magnetically attractable elements, one of said elements being carried by said movable wall, the other of said elements being carried by said member, said elements being normally in surface-to-surface direct contact with each other, switch parts carried by said member and positioned in said housing, and yielding means directly engaging at least one of said elements and urging said magnetically attractable elements in opposite directions and moving the switch parts carried by said member relative to the switch parts positioned in said housing, said member having a portion extending through a wall of said housing and carrying an indicator head, said indicator head being exposed outwardly of said housing in response to urging of said yielding means.

References Cited by the Examiner

UNITED STATES PATENTS

| | | | |
|---|---|---|---|
| 2,628,296 | 2/1953 | Dillman | 200—83 X |
| 2,991,338 | 7/1961 | Mason | 200—83 X |
| 3,077,176 | 2/1963 | Pall et al. | 116—70 |

FOREIGN PATENTS

| | | |
|---|---|---|
| 895,748 | 1/1960 | Great Britain. |

BERNARD A. GILHEANY, *Primary Examiner.*

G. MAIER, *Assistant Examiner.*